United States Patent [19]
Levedahl

[11] Patent Number: 5,679,089
[45] Date of Patent: Oct. 21, 1997

[54] BICOUPLED CONTRAROTATING EPICYCLIC GEARS

[75] Inventor: William J. Levedahl, Arlington, Va.

[73] Assignee: The United States of America as represented by the Secretary of the Navy, Washington, D.C.

[21] Appl. No.: 527,988

[22] Filed: Sep. 14, 1995

[51] Int. Cl.$^6$ ............................................. F16H 37/06
[52] U.S. Cl. .......................... 475/332; 475/330; 475/337; 475/347; 74/411
[58] Field of Search ........................... 475/221, 248, 475/330, 337, 346, 347, 332; 74/409, 410, 411, 406

[56] References Cited

U.S. PATENT DOCUMENTS

| | | | |
|---|---|---|---|
| 2,186,064 | 1/1940 | Dekker | 475/332 |
| 2,247,839 | 7/1941 | Halford et al. | 475/347 |
| 2,401,365 | 6/1946 | Mercier | 475/330 |
| 2,522,443 | 9/1950 | Gaubatz et al. | 475/332 |
| 2,700,311 | 1/1955 | Bade | 475/330 |
| 3,195,324 | 7/1965 | Sellwood et al. | 74/411 |
| 3,757,608 | 9/1973 | Willner | 475/347 |
| 4,121,476 | 10/1978 | Hammond | 74/411 |
| 5,083,989 | 1/1992 | Yates et al. | 475/332 |

*Primary Examiner*—Charles A. Marmor
*Assistant Examiner*—Sherry Lynn Estremsky
*Attorney, Agent, or Firm*—John Forrest; Jacob Shuster

[57] ABSTRACT

A compact bicoupled contrarotating epicyclic gear is provided. The gear includes a rotatable input shaft for providing an input-torque, a first-stage epicyclic gear, a second-stage epicyclic gear mutually drivably coupled to and in axial alignment with the first epicyclic gear, an outer-output shaft for conveying an outer-output-torque in response to the input-torque, and an inner-output shaft coaxial with the outer-output shaft for conveying an inner-output-torque in response to the input-torque. The bicoupled contrarotating epicyclic gear further includes at least one interstage torque carrier rotatably connecting the first and second epicyclic gears in series such that the first and second sun gears, the first and second planet carriers, and the first and second ring gears rotate and convey useful torque in response to the input-torque. The outer-output shaft is connected to the second-stage ring gear for rotating therewith in a first direction, and the inner-output shaft is torsionally coupled with the second-stage planet carrier for rotating therewith in a second direction, the second direction being opposite the first direction.

8 Claims, 5 Drawing Sheets

BICOUPLED CONTRAROTATING EPICYCLIC GEARS

STATEMENT OF GOVERNMENT RIGHTS

The invention described herein may be manufactured and used by or for the Government of the United States of America for governmental purposes without the payment of any royalties thereon or therefor.

CROSS REFERENCE TO RELATED APPLICATIONS

This application is related to a prior patent of the inventor's, U.S. Pat. No. 5,417,597, issued May 23, 1995, incorporated herein by reference.

BACKGROUND OF THE INVENTION

1. Field of Invention

The present invention relates generally to contrarotating gears and, more particularly, to bicoupled multistage contrarotating epicyclic gears that couple a single low-torque shaft to two coaxial high-torque, oppositely-torqued members.

2. Brief Description of Related Art

Conventional ship propulsion systems depend upon long shafting internal to the hull, with concomitant weight and shaft alignment penalties. Inflow to the propellers is skewed, decreasing propeller efficiency and inciting cavitation even at low speeds. The vortex of the propeller race reduces propeller efficiency and increases wake detectability. U.S. Pat. No. 5,417,597, entitled "Vessel With Machinery Modules Outside Watertight Hull," suggests the use of an electric motor housed in a substantially cylindrical pod appendage for driving contrarotating tractor propellers (propeller forward of the pod). The diameter of the pod should be as small as possible to reduce resistance. Preferably, the pod diameter should be less than the diameter of the propellers and, preferably, less than half the diameter of the propellers, and more preferably less than a third of the propeller diameter. Such a configuration will require a small-diameter motor and a small-diameter contrarotating gear to be mounted within the pod to couple the motor with the contrarotating propellers. However, the choice of suitable contrarotating reduction gears is limited.

A "reduction" gear is used to connect a high rotational speed, low-torque power source, such as an electric motor, to a low rotational speed, high-torque load, such as a propeller. The reduction gear reduces the rotational speed and increases the torque. A simple "single-stage" epicyclic reduction gear consists essentially of: (1) a central, externally-toothed sun gear of pitch diameter DS and length L and having NS teeth, the sun gear being connected to a rotating input-torque source of magnitude QS by means of an input shaft; (2) an internally-toothed ring gear of pitch diameter DR and length L and having NR teeth, wherein the ring gear is concentric with the sun gear (if the simple epicyclic gear is used as a single-stage contrarotating gear the ring gear transmits a torque of magnitude QR to an outer-output shaft); (3) one or more externally-toothed planet gears, each of which meshes with both the sun gear and the ring gear, each planet gear having NP teeth where NP is typically (NR-NS)/2; (4) a planet carrier upon which the planet gears are rotationally mounted and which carries the net force on the planet gears to an output shaft, the planet carrier having one spindle with associated journal bearing central to each planet gear; and (5) an inner-output shaft which is connected to the planet carrier and which is coaxial with the sun and ring gears. The planet carrier transmits an output-torque of magnitude QC to the inner-output shaft. For equilibrium, the sum of the torques on the sun gear, planet carrier and ring gear must be zero. The torque QC on the planet carrier, and thus the inner-output shaft, is equal and opposite to the sum of the torques on the input shaft (QS) and the ring gear (QR). The ratio of ring torque to sun torque is:

$$QR/QS = NR/NS = DR/DS.$$

The ratio of carrier torque to sun torque is:

$$QC/QS = -(DR/DS + 1).$$

The simple single-stage epicyclic gear becomes a "star" gear when the planet carrier is held stationary. The absolute output-torque ratio (ratio of output-torque to input-torque, also known as the "reduction ratio") is:

$$Q_{OUTPUT}/Q_{INPUT} = QR/QS = DR/DS.$$

The simple single-stage epicyclic gear becomes a "planetary" gear when the ring gear is held stationary. The absolute output-torque ratio is:

$$Q_{OUTPUT}/Q_{INPUT} = QC/QS = DR/DS + 1.$$

The simple single-stage epicyclic gear becomes a contrarotating gear if both the ring gear and the planet carrier are connected to coaxial rotating output shafts (e.g., ring gear connected to a rotating outer-output shaft and planet carrier connected to an oppositely rotating inner-output shaft, as would be the case when the gear is connected to contrarotating propellers). In a simple single-stage contrarotating epicyclic gear, all members are rotating; none is stationary. Useful output-torque is generated by the planet carrier and the ring gear from a single input-torque source connected to the sun gear. The absolute output-torque ratio is the sum of the star and planetary torques ratios:

$$Q_{OUTPUT}/Q_{INPUT} = (QC + QR)/QS = 2DR/DS + 1.$$

Installation of contrarotating reduction gear in a podded propulsor will require a small-diameter gear. However, a small-diameter, simple single-stage epicyclic gear has a limited range of possible torque-ratios. When the output-torque ratio required is larger than that achievable by a single-stage contrarotating epicyclic gear with 5 planet gears, the diameter, volume and weight may be too large and a "two-stage" contrarotating epicyclic gear may be used.

Hereinafter, when referring to two-stage gears, subscript 1 will refer to the first-stage gear and subscript 2 will refer to the second-stage gear. There are two basic configurations of a conventional two-stage epicyclic gear having a single rotating input shaft connected to the first-stage sun gear and a single rotating output shaft connected to the second-stage planet carrier. The first is a "planetary-planetary" configuration in which the planet carrier of the first-stage planet gear is connected to the sun of the second-stage planet gear, and both rings are held stationary. The absolute output-torque ratio is:

$$Q_{OUTPUT}/Q_{INPUT}=QC_2/QS_1=(DR_1/DS_1+1)(DR_2/DS_2+1).$$

The second is a "star-planetary" configuration in which the ring of the first-stage star gear is connected to the sun of the second-stage planet gear, and the planet carrier of the first-stage and the ring of the second-stage are held stationary. The absolute output-torque ratio is:

$$Q_{OUTPUT}/Q_{INPUT}=Qc_2/QS_1=(DR_1/DS_1)(DR_2/DS_2+1).$$

The conventional form of two-stage contrarotating reduction gears couples the high-torque output of a first-stage planetary gear or star gear to the sun gear of a second-stage contrarotating epicyclic gear. This is a "singly coupled" contrarotating gear in which one member of the first-stage is held stationary. Contrarotating output-torques are generated by the second-stage planet carrier and ring gear. Thus, the conventional form of a two-stage contrarotating epicyclic gear has only its second-stage contrarotating. The ratio of output-torques of the two output shafts is $(1+DS_2/DR_2)$ and is typically above 1.25 (i.e., high-torque-output shaft/low-torque-output shaft). That is, the difference between the output-torques of the inner and outer-output shafts is typically greater than 25%. Consequently, a significant torque is transmitted to the vehicle hull.

For the planetary-contrarotating two-stage gear (i.e., first-stage planet carrier coupled to second-stage sun gear, first-stage ring gear held stationary) the absolute output-torque ratio is:

$$Q_{OUTPUT}/Q_{INPUT}=(QC_2+QR_2)/QS_1=(DR_1/DS_1+1)(2DR_2/DS_2+1),$$

while $$Q_{OUTER-OUTPUT}/Q_{INNER-INPUT}=QR_2/QC_2=(1+DS_2/DR_2)$$

For the star-contrarotating two-stage gear (i.e., first-stage ring gear coupled to second-stage sun gear, first-stage planet carrier held stationary) the absolute output-torque ratio is:

$$Q_{OUTPUT}/Q_{INPUT}(QC_2+QR_2)/QS_1=(DR_1/DS_1)(2DR_2/DS_2+1),$$

while $$Q_{OUTER-OUTPUT}/Q_{INNER-INPUT}=QC_2/QR_2=(1+DS_2/DR_2)$$

A podded propulsor driving contrarotating propellers will require a small-diameter motor and a small-diameter contrarotating reduction gear to be mounted within the pod. However, to produce the desired reduction in rotational speed between the driving motor and the contrarotating propellers (e.g., for a typical Naval combatant, the propulsion motor rotates at about 3600 rpm and propellers rotate at about 120 rpm) with a corresponding output-torque ratio, conventional contrarotating reduction gears generally require very large diameter gears and, thus, are heavy, costly, and occupy a large volume. Additionally, conventional two-stage planetary-contrarotating gears have excessive radial centrifugal loads on the first-stage planet bearings, i.e., bearings between rotating planet gears and spindles upon which they rotate. These excessive loads limit the efficiency and use of conventional two-stage planetary-contrarotating gears and, if the loads are large enough, can cause gear failure. Thus, a large star-contrarotating gear with stationary planet spindles, is necessary.

Consequently, there is a need for a contrarotating gear capable of generating torque-ratios comparable to those generated by prior art contrarotating gears using smaller diameter gearsets than prior art contrarotating gears. There is a further need for a contrarotating gear that reduces radial and centrifugal loads on the planet bearings, thus reducing bearing friction and heat generation. Moreover, it is often desirable to have the forward and aft contrarotating propellers generating approximately equal torques. However, conventional two-stage contrarotating reduction gears have a ratio of output-torques of the two output shafts that is typically above 1.25 (i.e., high-torque-output 25% or more greater than low-torque-output). Thus, there is a need for a contrarotating gear capable of producing a ratio of output-torques closer to unity than has been the case with prior art contrarotating gears. Such a contrarotating gear will transmit very little torque to the ship hull. Additionally, prior art contrarotating gears generally produce gear tooth vibrations that are transferred to the rotating output shafts providing a detrimental noise source. Thus, there is a need for a contrarotating gear capable of attenuating gear tooth vibrations prior to transmission to output shafts and bearings.

SUMMARY OF THE INVENTION

Accordingly, it is an object of the present invention to provide a contrarotating gear that overcomes the above mentioned problems associated with prior art contrarotating gears.

It is a further object of the present invention to provide a two-stage contrarotating gearset with a smaller overall diameter than prior art contrarotating gears having similar outputs.

It is still a further object of the present invention to provide a two-stage contrarotating gear having lower radial and centrifugal loads on the planet bearings.

It is still a further object of the present invention to provide a two-stage contrarotating gear in which gear tooth vibrations are isolated from the output shafts and bearings.

Other objects and advantages of the present invention will become apparent to those skilled in the art upon a reading of the following detailed description taken in conjunction with the drawings and the claims supported thereby.

In accordance with the present invention, these and other objects are met by providing a bicoupled contrarotating epicyclic gear including a rotatable input shaft for providing an input-torque to the bicoupled contrarotating epicyclic gear, a first epicyclic gear, a second epicyclic gear mutually drivably coupled to and in axial alignment with the first epicyclic gear, an outer-output shaft for conveying an outer-output-torque in response to the input-torque, and an inner-output shaft coaxial with the outer-output shaft for conveying an inner-output-torque in response to the input-torque. The first and second epicyclic gears are joined in series such that all rotatable members (i.e., the first and second sun gears, the first and second planet carriers and all associated planet gears, and the first and second ring gears) rotate and convey useful torque in response to the input-torque. The first epicyclic gear includes a first sun gear coupled to the input shaft, a first ring gear coaxial with the first sun gear, a first planet carrier having a plurality of spindles attached thereto, and a plurality of first planet gears, one planet gear being rotatably mounted on a corresponding one of the spindles, wherein each of the first planet gears continuously meshes with both the first sun gear and the first ring gear. The second epicyclic gear includes a second sun gear, a second ring gear coaxial with the second sun gear, a second planet carrier having a plurality of spindles attached thereto, and a plurality of second planet gears, one planet gear being rotatably mounted on a corresponding one of the spindles, wherein each of the second planet gears continuously meshes with both the second sun gear and the second ring gear. The bicoupled contrarotating epicyclic gear further includes two rotating interstage torque carriers connecting the first and second epicyclic gears such that the first and second sun gears, the first and second planet carriers and all associated planet gears, and the first and second ring gears rotate and convey useful torque in response to the input-torque. One interstage torque carrier carries torque from one of two high-torque members of the first epicyclic gear (i.e., first ring gear or first planet carrier) to the second sun gear. The other interstage torque carrier carries torque from the other of the two high-torque members of the first epicyclic gear to the outer-output shaft. The outer-output shaft is connected, through one of the two interstage torque carriers, to the second ring gear for rotating therewith in a first direction, and the inner-output shaft is coupled with the second planet carrier for rotating therewith in a second direction, the second direction being opposite the first direction.

In one preferred embodiment of the bicoupled contrarotating epicyclic gear, a first interstage torque carrier connects the first ring gear and the second ring gear, and a second interstage torque carrier couples the first planet carrier and the second sun gear. Furthermore, the outer-output shaft is coupled to the first interstage torque carrier.

In another preferred embodiment of the bicoupled contrarotating epicyclic gear, a first interstage torque carrier connects the first ring gear and the second sun gear, and a second interstage torque carrier connects the first planet carrier and the second ring gear. Additionally, the outer-output shaft is coupled to the second interstage torque carrier.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding element throughout and wherein.

DETAILED DESCRIPTION OF THE PREFERRED EMBODIMENT

Figure 1:
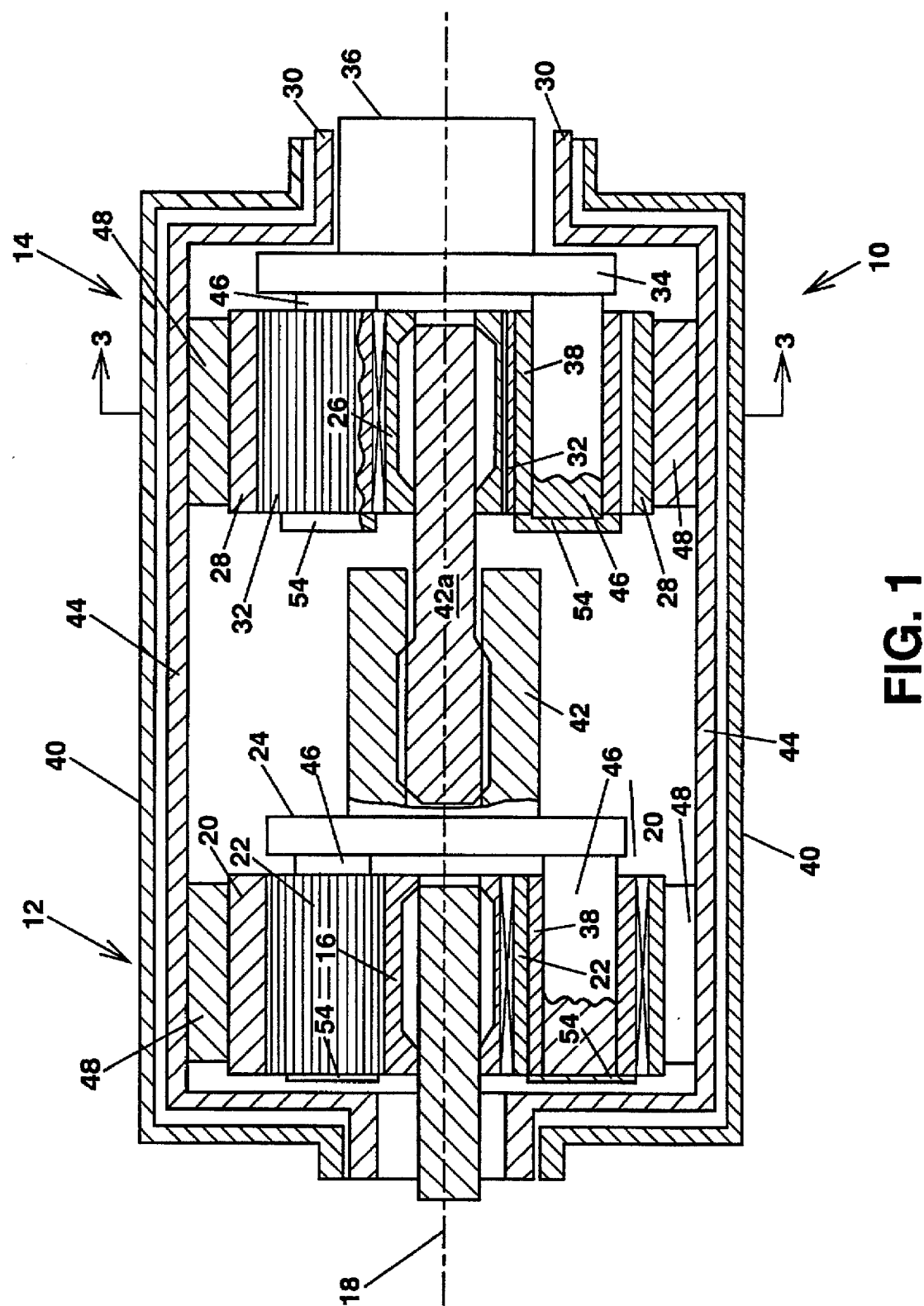
FIG. 1. is a cross-sectional side view of a ring-ring bicoupled contrarotating epicyclic reduction gear in accordance with the present invention.

A two-stage "bicoupled contrarotating epicyclic gear" 10 in accordance with the present invention couples a first contrarotating epicyclic gear 12 in series with a second contrarotating epicyclic gear 14 such that all torqued members (i.e., members placed in torsion as a result of application an input-torque) rotate and convey useful torque. The present invention connects what are essentially two simple "single-stage" epicyclic reduction gears in a novel fashion to produce a given torque-ratio from a smaller diameter gear package than is believed to be presently available. In one envisioned application of the present invention, bicoupled contrarotating epicyclic gear 10 may have a single input-torque source coupled to its high-speed-stage sun gear for providing contrarotating output-torques from its low-speed-stage ring gear and planet carrier. Alternatively, the present invention may have contrarotating input-torque sources (e.g., an outer-input shaft transmitting an outer-input torque and an inner-input shaft transmitting an inner-input torque) coupled to its low-speed-stage ring gear and planet carrier for providing a single output-torque from its high-speed-stage sun gear to a single output shaft. For example, when coupled to a single input-torque source (e.g., a high speed electric motor), the present invention is useful for driving coaxial, contrarotating propellers such as used on marine vehicles. Conversely, the bicoupled contrarotating gear is useful for combining the power of low speed, coaxial, contrarotating wind impellers as input to a high speed electric generator. Although it is to be understood that the present invention applies to both alternatives described above, two preferred embodiments will be described below in terms of configurations having a single input-torque source into a high-speed, first-stage epicyclic gear 12 and contrarotating output-torques from a low-speed, second-stage epicyclic gear 14.

First-stage epicyclic gear 12 includes a central, externally-toothed sun gear 16 (preferably a double-helical sun gear) connected to a rotating input shaft 18; an internally-toothed ring gear 20 concentric with and axially collocated with sun gear 16; a plurality of externally-toothed planet gears 22 (preferably double-helical planet gears), each of which continuously intermeshes with both sun gear 16 and ring gear 20; and a planet carrier 24 upon which planet gears 22 are rotationally mounted. Second-stage epicyclic gear 14 includes a central, externally-toothed sun gear 26 (preferably a double-helical sun gear) connected to a rotating interstage torque carrier; an internally-toothed ring gear 28 concentric with and axially collocated with sun gear 26 and connected to a rotating outer-output shaft 30; a plurality of externally-toothed planet gears 32 (preferably double-helical planet gears), each of which continuously intermeshes with both sun gear 26 and ring gear 28; and a planet carrier 34 upon which the planet gears 32 are rotationally mounted. Planet carrier 34 is connected to a rotating inner-output shaft 36. Each planet carrier 24, 34 has a plurality of spindles 38 mounted thereon upon which the planet gears 22, 32 are rotationally mounted, one spindle 38 being central to each planet gear 22, 32. Although, given a desired torque-ratio, determining the desired number of planet gears is within the ability of a person of ordinary skill in the art in light of the teachings of this disclosure, there are preferably between 4 and 6 planet gears in first-stage epicyclic gear 12 and between 5 and 7 planet gears in second-stage epicyclic gear 14. First-stage planet carrier 24 and first-stage ring gear 20 are connected to second-stage sun gear 26 and second-stage ring gear 28, as more fully described below, by way of interstage torque carriers. Moreover, all rotatable members of both first-stage epicyclic gear 12 and second-stage epicyclic gear 14 are rotating and carrying useful torque, i.e., none is fixed as is the case with prior art contrarotating gears. This general configuration wherein all rotatable members of both stages rotate is defined as a "bicoupled contrarotating epicyclic gear." All materials used in construction of the present invention are conventional metals, metal composites and/or fiber reinforced resin composites (e.g., carbon-fiber reinforced plastic) used in gear manufacture and will not be referred to in detail herein. Bearings in which rotatable parts are mounted are conventional.

Figure 3:
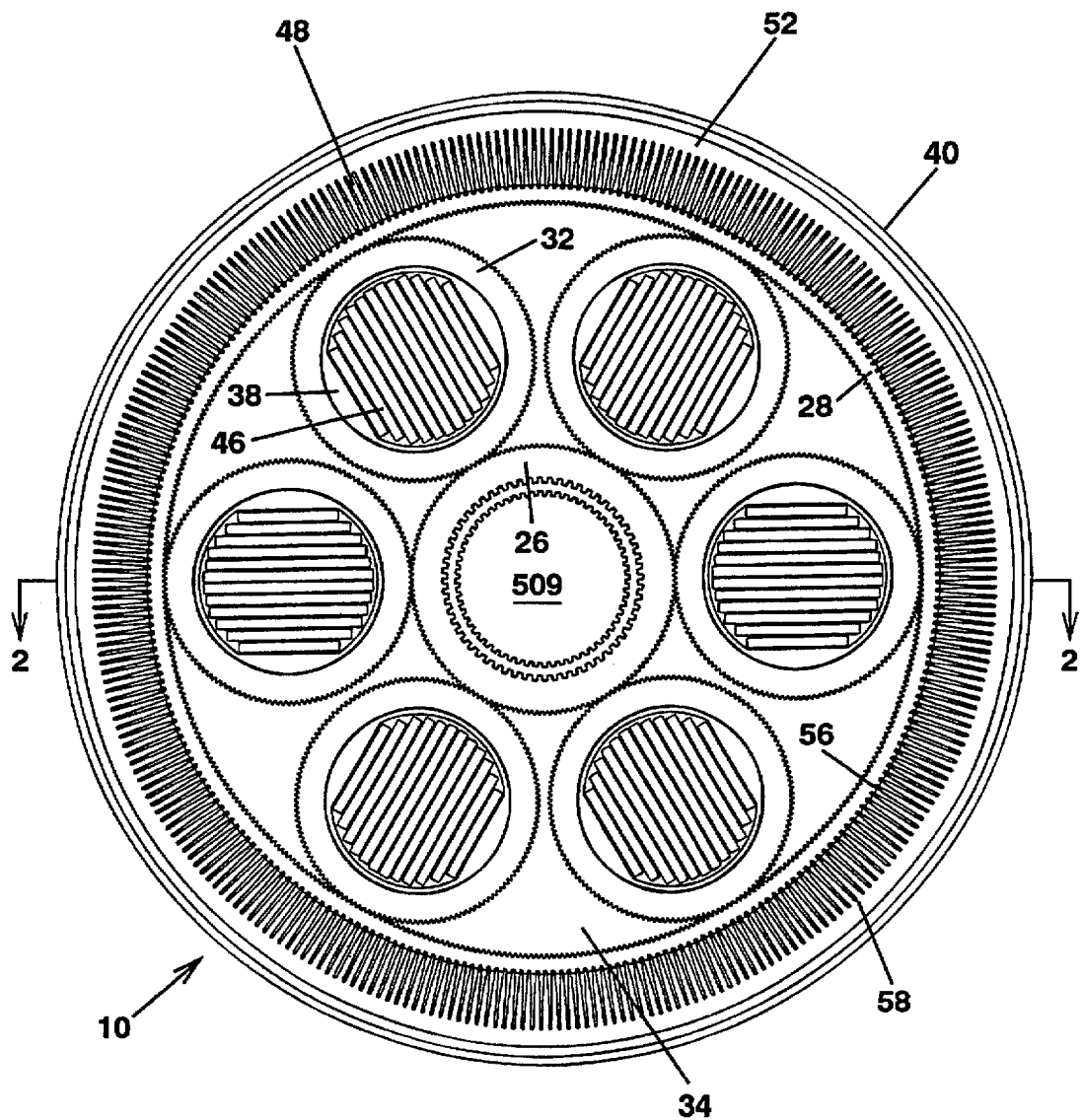
FIG. 3. is a cross-sectional end view of a bicoupled contrarotating epicyclic reduction gear in accordance with the present invention taken along line 3—3 of FIGS. 1 or 2.

Referring now to the drawings, and particularly to FIGS. 1 and 3, one preferred embodiment of the bicoupled contrarotating epicyclic gear of the present invention, a "ring-ring bicoupled contrarotating epicyclic gear," is shown. Ring-ring bicoupled contrarotating gear 10 is essentially a two-stage planetary-planetary epicyclic gear in which all torqued members rotate and convey useful torque during operation of the gear. Ring-ring bicoupled contrarotating epicyclic gear 10 has a two-stage epicyclic configuration with first-stage epicyclic gear 12 and second-stage epicyclic gear 14 rotatably mounted in axial alignment in outer casing 40. The mounting of gears and input and output shafts for rotation in a casing using, for example, well known bearings is within the ability of a person of ordinary skill in the art, in light of the teachings of this disclosure, and will not be described in detail herein.

Ring-ring bicoupled contrarotating epicyclic reduction gear 10 is characterized by: input-torque source, e.g., input shaft 18, being coupled at a first end to a power source (not shown) and being torsionally connected at a second end to first-stage sun gear 16 (herein, "torsionally connected" and "torsionally coupled" refers to a connection or coupling that transfers rotation and torque between two members, the torque being about the axis of rotation, but need not necessarily transfer bending moments); first-stage planet carrier 24 being torsionally connected to second-stage sun gear 26 using interstage torque carrier 42 (interstage torque carrier 42 may comprise a single piece or may comprise torque carrier 42 and interstage quill shaft 42a connecting torque carrier 42 and sun gear 26); first-stage ring gear 20 and second-stage ring gear 28 being torsionally connected using interstage torque carrier 44 which is in turn torsionally connected to outer-output shaft 30; and second-stage planet carrier 34 being torsionally connected to inner-output shaft 36. Ring-ring bicoupled epicyclic contrarotating reduction gear 10 provides the maximum torque-ratio (maximum output-torque) for simple (non-compound), two-stage reduction gears. Furthermore, the absolute ratio of outer to inner-output-torques is the minimum possible. Ring-ring bicoupled contrarotating epicyclic reduction gear 10 also has lower centrifugal stress on the first-stage planet bearings (bearings between planet gears and spindles upon which they are mounted) than is the case with conventional, prior art two-stage contrarotating gears having fixed ring gear first-stages and contrarotating second-stages. Because first-stage ring gear 20 rotates, first-stage planet carrier 24 turns at a lower rate than if the ring gear were held stationary.

Additionally, ring-ring bicoupled contrarotating epicyclic reduction gear 10 may include vibration suppressing springs between all output gears and outer and inner-output shafts 30, 36, as more fully described below. Briefly, planet spindle springs 46 incorporated into the shafts of planet carrier spindles 38, and ring gear tangential springs 48 between ring gears 20, 28 and interstage torque carrier 44, and thus torsionally connecting ring gears 20, 28 with the outer-output shaft 30, provide means of reducing transmission of vibration between the gears and the output shafts.

An exemplary ring-ring bicoupled contrarotating epicyclic reduction gear with five planet gears in the first-stage and seven in the second-stage will power contrarotating propellers at a output-torque ratio of approximately 30 to 1.

In the seven-planet second-stage, each of the double-helical planet gears meshes with both sun and ring gears. The 28 meshes are out of phase, and each planet gear has about 100 teeth so that individual tooth engagements produce very small torsional accelerations. Flexible spindle springs and flexible ring gear springs greatly attenuate vibrations before they reach the shafts and propellers.

For the ring-ring bicoupled contrarotating gear, the absolute torque ratio on outer-output shaft 30, which is coupled to second-stage ring gear 28, is:

$$Q_{OUTER-OUTPUT}/Q_{INPUT}=(DR_1/DS_1+1)(D_2/DS_2)+DR_1/DS_1.$$

The absolute torque-ratio on inner-output shaft 36, which is coupled to second-stage planet carrier 34, is:

$$Q_{INNER-OUTPUT}/Q_{INPUT}=(DR_1/DS_1+1)(DR_2/DS_2+1).$$

The combined absolute torque on the two output shafts is:

$$Q_{TOTAL-OUTPUT}=2[(DR_1/DS_1+1)(DR_2/DS_2+1)]-1.$$

The ratio of output-torques between outer-output shaft 30 and inner-output shaft 36 is:

$$Q_{OUTER-OUTPUT}/Q_{INNER-INPUT}=1-1/[(DR_1/DS_1+1)(DR_2/DS_2+1)].$$

The particular torque-ratio ($Q_{OUTPUT}/Q_{INPUT}$) is dependent upon the ratio of ring gear to sun gear diameter in each stage. However, for similar two-stage planetary systems, ring-ring bicoupled contrarotating gear 10 provides the maximum possible torque-ratio for any simple, two-stage gear. Moreover, the torques on the inner and outer-output shafts are as nearly equal as possible. In the case of the ring-ring bicoupled contrarotating gear configuration, the inner-output shaft has a higher absolute torque than the outer-output shaft. Therefore, the absolute ratio of inner-to-outer-output-torques ($Q_{INNER-OUTPUT}/Q_{OUTER-OUTPUT}$) is the minimum possible.

Figure 2:
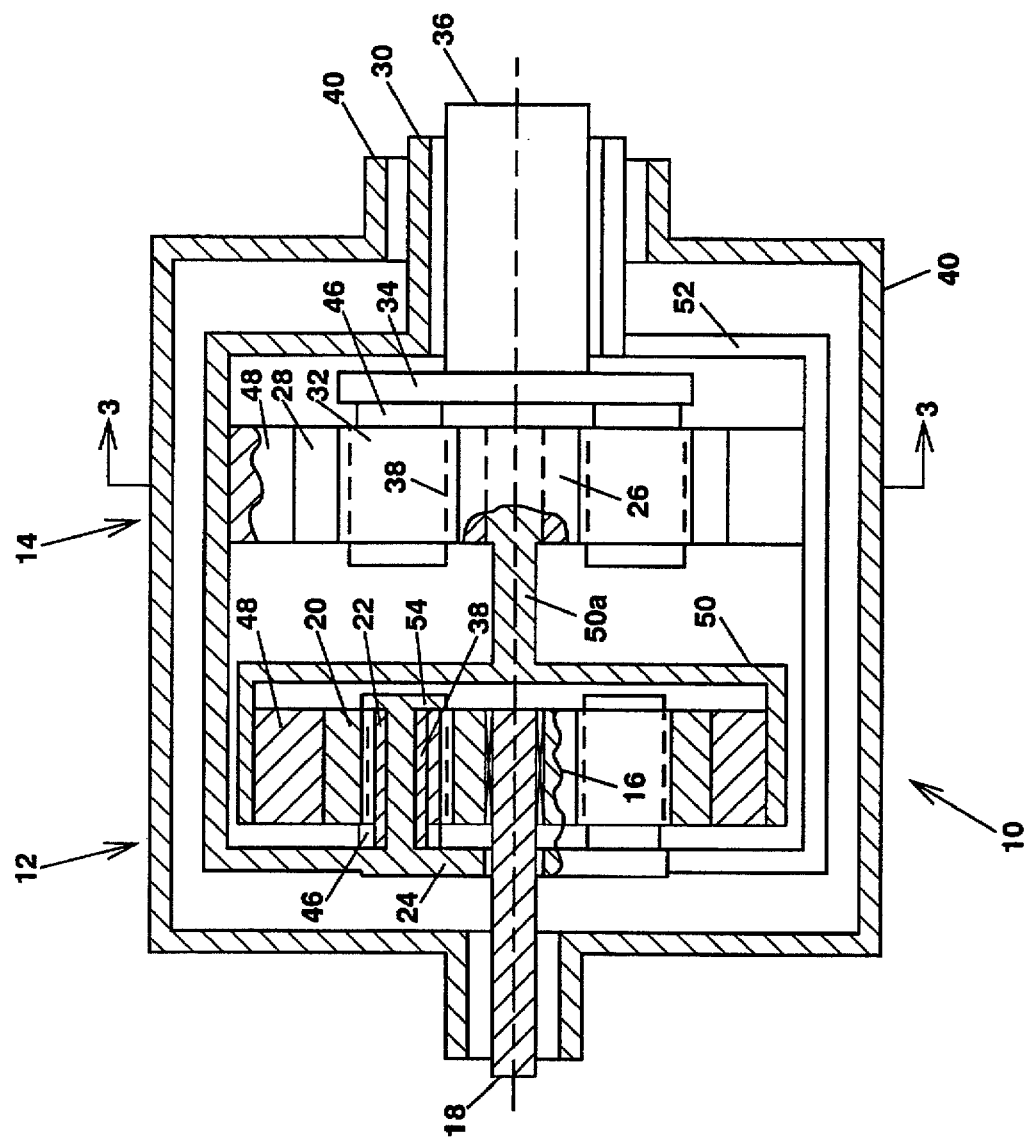
FIG. 2. is a cross-sectional side view of a carrier-ring bicoupled contrarotating epicyclic reduction gear in accordance with the present invention.

Referring now to the drawings, and particularly to FIGS. 2 and 3, a second preferred embodiment of the bicoupled contrarotating epicyclic gear of the present invention, a "carrier-ring bicoupled contrarotating epicyclic gear," is shown. Carrier-ring bicoupled contrarotating gear 10 is essentially a two-stage star-planetary epicyclic gear in which all torqued members rotate and convey useful torque during operation of the gear. Relative to the ring-ring configuration, first-stage epicyclic gear 12 is rotated 180°, i.e., first-stage planet carrier 24 faces input shaft 18, while the orientation of second-stage epicyclic gear 14 remains the same, i.e., second-stage planet carrier 34 faces output shaft 30, 36. Carrier-ring bicoupled contrarotating epicyclic gear 10 has a two-stage epicyclic configuration with first-stage epicyclic gear 12 and second-stage epicyclic gear 14 rotatably mounted in axial alignment in outer casing 40.

Carrier-ring bicoupled contrarotating epicyclic reduction gear 10 is characterized by: input-torque source, e.g., input shaft 18, being coupled at a first end to a power source (not shown) and being torsionally connected at a second end to first-stage sun gear 16; first-stage ring gear 20 being torsionally connected to second-stage sun gear 26 using interstage torque carrier 50 (interstage torque carrier 50 may comprise a single piece or may comprise torque carrier 50 and interstage quill shaft 50a connecting torque carrier 50 and sun gear 26); first-stage planet carrier 24 being torsionally connected to second-stage ring gear 28 using interstage torque carrier 52 which is in turn torsionally connected to outer-output shaft 30; and second-stage planet carrier 34 being torsionally connected to inner-output shaft 36. When first-stage bearing loss (or bearing loads) become excessive with the ring-ring configuration of the present invention, the carrier-ring configuration becomes the best choice of all simple two-stage epicyclic gears. The carrier-ring bicoupled contrarotating gear provides a lower maximum output-torque ratio than provided by a ring-ring bicoupled contrarotating gear with the same ring gear to sun gear diameter ratios. However, the carrier-ring bicoupled gear reduces planet bearing centrifugal loads on the high-speed first-stage relative to the ring-ring bicoupled gear. Consequently, when centrifugal loads on the first-stage of a ring-ring bicoupled contrarotating gear become so large as to require excessively large bearings and the corresponding bearing frictional losses limit gear operation, the carrier-ring configuration is preferred.

Additionally, carrier-ring bicoupled contrarotating epicyclic reduction gear 10 may include vibration suppressing springs between all output gears and outer and inner-output shafts 30, 36 as more fully described below. Briefly, planet spindle springs 46 built into the shafts of planet carrier spindles 38, and ring gear tangential springs 48 between ring gears 20 and 28 and interstage torque carriers 50 and 52, respectively, and thus rotatably connecting ring gear 20 with sun gear 26 and rotatably connecting ring gear 28 with the outer-output shaft 30, provide means of reducing transmission of vibration between the gears and the output shafts.

An exemplary carrier-ring bicoupled contrarotating epicyclic reduction gear with five planet gears in the first-stage and seven in the second-stage will power contrarotating propellers at an output-torque ratio of approximately 23 to 1. In the seven-planet second-stage, each of the double-helical planet gears meshes with both sun and ring gears. The 28 meshes are out of phase, and each planet gear has about 100 teeth so that individual tooth engagements produce very small torsional accelerations. Flexible spindles and flexible-tooth ring-gear springs greatly attenuate vibrations before they reach the shafts and propellers.

For the carrier-ring bicoupled contrarotating gear, the absolute torque ratio on outer-output shaft 30, which is coupled to second-stage ring gear 28 is:

$$Q_{OUTER-OUTPUT}/Q_{INPUT}=(DR_1/DS_1)(DR_2/DS_2+1)+1.$$

The absolute torque ratio on inner-output shaft, 36 which is coupled to second-stage planet carrier 34 is:

$$Q_{INNER-OUTPUT}/Q_{INPUT}=(DR_1/DS_1)(DR_2/DS_2+1).$$

The combined absolute torque on the two output shafts is:

$$Q_{TOTAL-OUTPUT}=2(DR_1/DS_1)(DR_2/DS_2+1)+1.$$

The ratio of output-torques between the outer-output shaft and inner-output shafts is:

$$Q_{OUTER-OUTPUT}/Q_{INNER-INPUT}=1+1/[(DR_1/DS_1)(DR_2/DS_2+1)].$$

In the case of the carrier-ring bicoupled contrarotating gear, the outer-output shaft has a higher absolute torque than the inner-output shaft.

Both the ring-ring bicoupled contrarotating gear configuration and the carrier-ring bicoupled contrarotating gear configuration may include means for flexibly connecting the plurality of spindles 38 with corresponding planet carriers 24, 34. Furthermore, each configuration may include means for flexibly connecting ring gears 20, 28 with corresponding interstage torque carriers (44 if a ring-ring configuration; 50 and 52 if a carrier-ring configuration). Consequently, flexibly connecting means will damp vibrations between the ring gears and outer-output shaft (in the case of the ring-ring configuration) and between the first-stage ring gear and the second-stage sun gear and between the second-stage ring gear and the outer-output shaft (in the case of the carrier-ring configuration). Additionally, the flexible connecting means may be further dampened by elastomers. Flexibly connecting means, e.g., springs coupled to the spindles 38 and ring gears 20, 28, facilitate load sharing between the planet gears 22, 32, and isolate gear-tooth vibrations from the output shafts and bearings. Flexibly connecting means may be made of metals, metal composites, or fiber reinforced resin composites (e.g., glass reinforced plastic). The means for connecting springs and corresponding gear members or output shafts may include any suitable, conventional means. For example, metallic springs may be welded, fiber/resin composite springs may be bonded using suitable adhesives; and/or the springs and corresponding members upon which they are mounted may be fashioned with male/female parts for interlocking connections.

Figure 4:
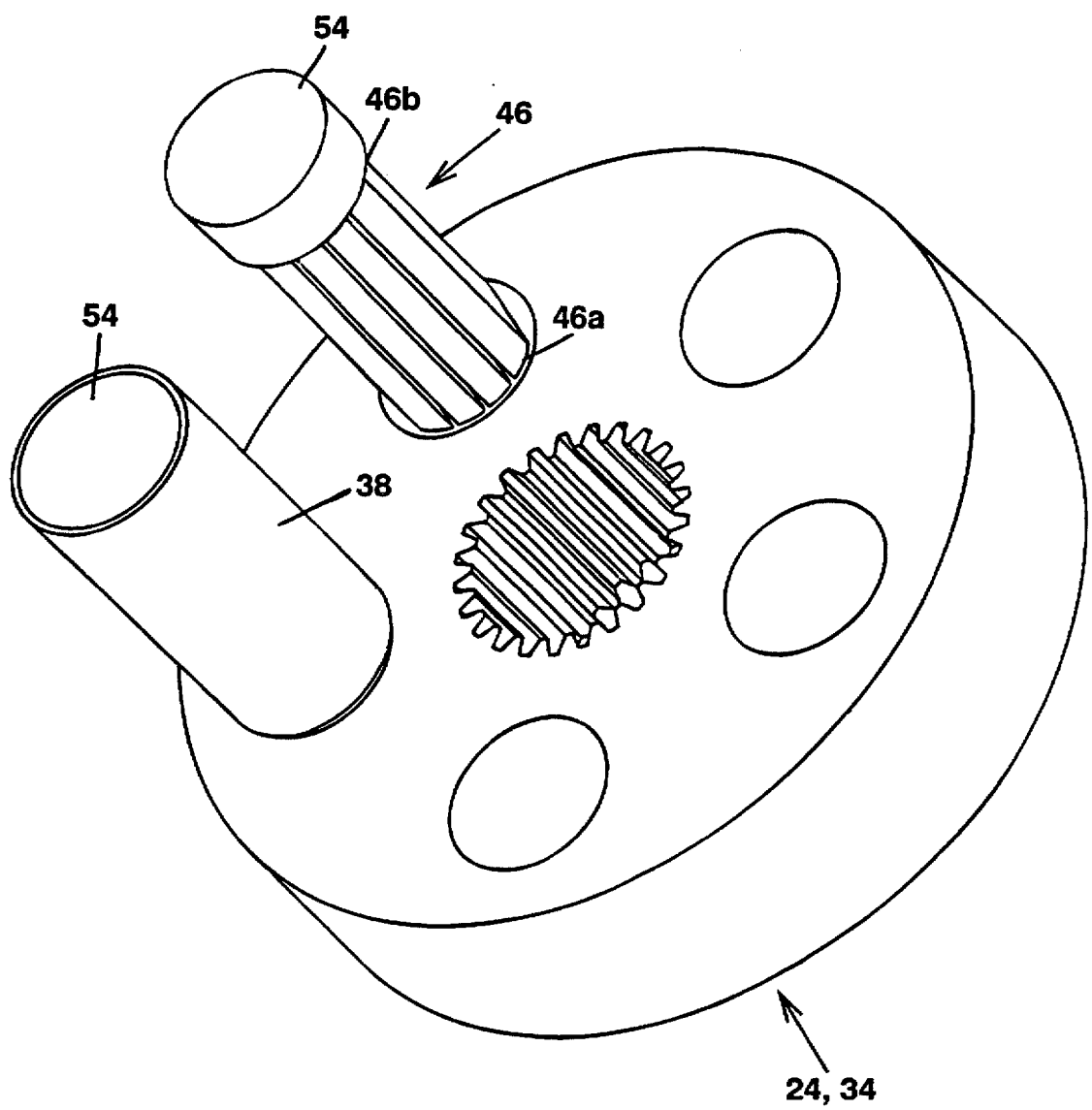
FIG. 4. is a perspective view showing the mounting of planet carrier spindles on flexible leaf springs in accordance with the present invention.

Planet spindles 38 may be mounted on flexible planar members, e.g., internal leaf springs 46. Internal leaf springs 46 enable good load sharing between planet gears 22, 32 and attenuate planet gear-tooth vibration prior to transmission of vibrations to output shafts and bearings. In prior art designs, where the spindles are rigidly mounted directly to the planet carrier, if the spindles are not perfectly distributed around the carrier one or more planet gears may form imperfect unions with the sun and/or ring gears. This leads to imperfect load sharing between the planet gears, i.e., one or more planet gears will carry a greater load than the remaining planet gears. However, by letting the planet gears 22, 32 "float" on spring mounted spindles 38, a continuous intermeshing is effected between the planet gears and both the sun and ring gears resulting in improved load sharing and improved efficiency. The mounting of the spindles to corresponding planet carriers by way of internal leaf springs will now be explained. All spindle/leaf spring combinations are mounted to respective planet carriers in the same way. Referring now to FIG. 4, each spindle 38 is essentially a hollow cylindrical member having therein a plurality of leaf springs 46 flexibly connecting spindle 38 with corresponding planet carrier 24, 34. Internal leaf springs 46 are fixed at a first end 46a to corresponding planet carrier 24, 34 and are fixed at a second end 46b to a spindle end cap 54. Preferably, end cap 54 has a diameter equal to the inner diameter of spindle 38 and a thickness of about half the spindle inner diameter. End cap 54 and spindle 38 may be threaded and screwed together, or may be welded or brazed together. Each spindle 38 is fixed, at its end portion that is remote from its corresponding planet carrier, to end cap 54 such that spindle 38 projects from end cap 54 towards corresponding planet carrier 24, 34 and surrounds leaf springs 46. End cap 54 may be fully internal to spindle 38, as show in FIG. 4, or may be externally mounted to the end of spindle 38, as shown in FIGS. 1 and 2. Additionally, all empty spaces within the hollow spindle 38 and between leaf springs 46 may be filled with an elastomer material, e.g., rubber or polyurethane. The planet gears are then mounted for rotation (e.g., on journal bearings) on individual spindles. Ring gears 20, 28 may have mounted thereon means 48 for flexibly connecting first and second ring gears 20 and 28 with corresponding interstage torque carriers (44 if a ring-ring configuration; 50 and 52 if a carrier-ring configuration). Flexible connecting means 48 attenuate gear-tooth vibration prior to transmission to the outer-output shafts and bearings. Ring gears 20, 28 are circular in cross-section having inner and outer peripheral surfaces. Each ring gear has teeth formed on the inner periphery for meshing with corresponding planet gears. Each ring gear 20, 28 may further have a plurality of slots 56 evenly distributed about its outer periphery. Interstage torque carriers 44, 50 and 52, which concentrically surround ring gears 20, 28 and form annular spaces therebetween, may have a corresponding number of grooves 58 formed in their inner peripheries. The flexible connecting means include tangential springs 48 that may take the form of a continuous, substantially annular shaped, pleated spring having a corresponding number of teeth on its inner and outer edges (i.e., opposing folds of each pleat) that mesh with the slots in ring gears 20, 28 and corresponding interstage torque carriers 44, 50 and 52. Thus, tangential springs 48 are fixed to the outer periphery of corresponding ring gears 20, 28 and the inner periphery of corresponding interstage torque carriers 44, 50 and 52. So mounted, tangential springs 48 are flexible tangentially and radially. Alternatively, the flexible connecting means may take the form of a plurality of flexible members (as shown in U.S. Pat. No. 5,417,597 incorporated herein by reference), preferably curved members, each flexible member fixedly meshing at a first end with the slots in corresponding ring gears 20, 28 and at a second end with slots in corresponding interstage torque carriers 44, 50 and 52. Additionally, all empty spaces within the space between the ring gears and the interstage torque carriers and between the flexible members may be filled with an elastomer material, e.g., rubber or polyurethane.

Figure 5:
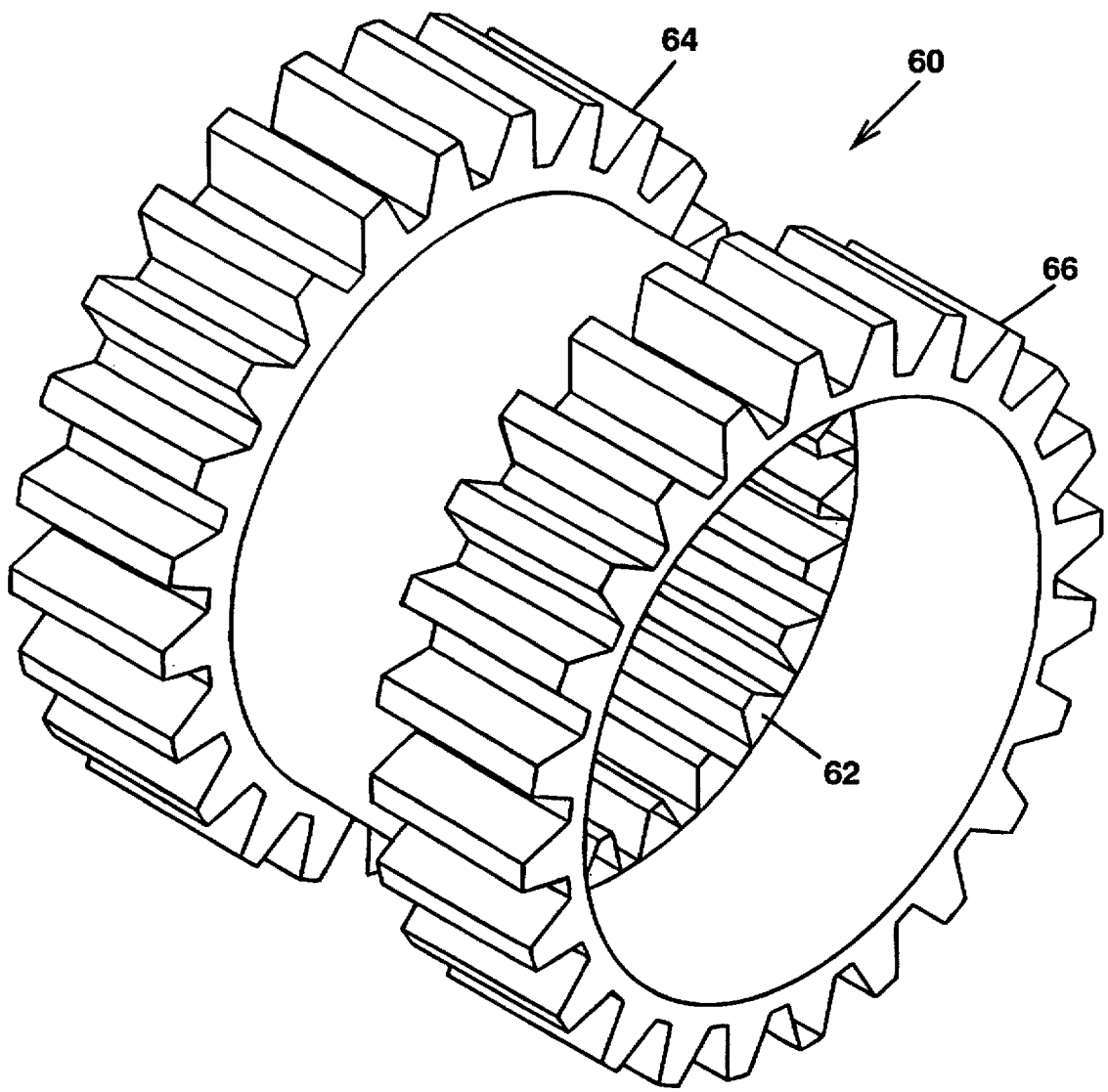
FIG. 5. is a perspective view of the torque splitter of the present invention.

Each sun gear 16, 26 is coupled to a torque carrier (e.g., input shaft 18 or interstage torque carriers 42 or 42a, 50 or 50a) through a splined coupling that distributes the transferred torque over the axial length of the sun gear (the axial length of each sun gear being approximately equal to the axial length of the corresponding planet gears). Preferably, the splined coupling transfers the torque to double helical sun gears adjacent the axial center of each of the two faces of the double helical gears. The splined coupling may take the form of internal splines in the sun gear to mesh with a splined torque carrying shaft or may be a splined sleeve between the input shaft and the sun gear. A preferred embodiment of the splined coupling is torque splitting splined coupling 60 as shown in FIG. 5. If the sun gear were attached only at its aft end to a torque source, the gear would twist under a load. If the sun and its meshing planet gears were machined to mesh uniformly when twisted under full load, the untwisting when load is reduced would leave nearly all the load on the forward end of the forward mesh of the double helical gears if the gears were not free to slide longitudinally, and at the forward end of each mesh if the gears were allowed to slide freely. If the sun gear had an internal spline in the longitudinal center, and was torqued by a splined input or quill shaft, and the gears were built to have uniform contact at full load, then at light load the forward end of the forward mesh and the after end of the after mesh would be in contact. The total gear twist would be about one quarter that of the previously described end-torqued sun gear. To overcome these problems, torque splitting splined coupling 60 torques double helical sun gears 16, 26 at the longitudinal centers of the forward and aft meshes. Torque splitter 60 is a metallic annular sleeve having a length that does not exceed that of the sun gear. Torque splitter 60 includes an internal spline 62 and two sets of external splines 64, 66. Internal spline 62 is longitudinally centered substantially about the longitudinal center of corresponding internally splined sun gear 16, 26. First external spline 64 is longitudinally centered substantially about the longitudinal center of the forward set of teeth of corresponding double helical sun gear 16, 26. Second external spline 66 is longitudinally centered substantially about the longitudinal center of the after set of teeth of corresponding double helical sun gear 16, 26. Externally splined input shaft 18, or externally splined quill shafts 42a, 50a torque internal spline 62 of torque splitter 60. External splines 64, 66 of torque splitter 60 transmit approximately equal torques to the two meshes of double helical sun gears 16, 26. By receiving input-torques near the longitudinal center of sun gears 16, 26, and transmitting the torque to the forward and aft meshes of sun gears 16, 26 near their longitudinal centers, torque splitter 60 reduces the total twist by a factor of about 16 over an end-torqued sun gear. Moreover, meshes of sun gears 16, 26 and of planet gears 22, 32 are in full contact over a much larger fraction of their load range resulting in less noise and more even wear.

To show the advantage, in terms of size, of the present invention over prior art gears, we will compare five different epicyclic gears transmitting the same power over the same speed ratio. We assume an electric motor providing, by way of a reduction gear, 20 Mw of power at 60 revolutions/second to either a single propeller (for single rotation gears) or coaxial contrarotating propellers (for contrarotating gears). The propellers are approximately 4.5 to 5 meters in diameter and absorb the 20 Mw of power at 2 revolutions/second. The speed reduction (and torque ratio) is 30:1 in all cases. All gears can be designed to have reasonable bearing pressures. The k factor on the gears is 2 MPa (290 psi) in all cases; the journal bearing nominal pressures do not exceed 3.45 MPa (500 psi); and the sun gears have face widths equal to their pitch diameters. In the following comparisons: DR is the pitch diameter of the largest ring gear; DS is the pitch diameter of the sun gears; subscripts 1 and 2 refer to the first-stage and second-stage of a two-stage gear, respectively; V is the sum of the ring gear volumes; X and W are the ratios of diameters and volumes, respectively, to those of the ring-ring bicoupled configuration.

Example 1 - single-stage star gear, single rotation, 2 planet gears, DR/DS=30:

DR=9.05 m, V=19.4 m$^3$, X=10.4, W=53.9.

Example 2 - two-stage star-planetary gear, single rotation, 4 planet gears in first-stage, $DR_1/DS_1$=5.5, 4 planet gears in second-stage, $DR_2/DS_2$=4,455:

DR=2.00 m, V=1.77 m$^3$, X=2.30, W=4.92.

Example 3 - two-stage star-contrarotating gear, 4 planet gears in first-stage, $DR_1/DS_1$=5.5, 5 planet gears in second-stage, $DR_2/DS_2$=3.227:

DR=1.37 m, V=0.99 m$^3$, X=1.57, W=2.75.

Example 4 - carrier-ring bicoupled contrarotating gear, 5 planet gears in first-stage, $DR_1/DS_1$=3.6, 5 planet gears in second-stage, $DR_2/DS_2$=3.027:

DR=1.12 m, V=0.51 m$^3$, X=1.29, W=1.42.

Example 5 - ring-ring bicoupled contrarotating gear, 5 planet gears in first-stage, $DR_1/DS_1$=3.6, 7 planet gears in second-stage, $DR_2/DS_2$=2,370:

DR=0.87 m, V=0.36 m$^3$, X=1.00, W=1.00.

It is evident that the diameters vary over a range greater than 10 and the volumes (which imply weight and cost) vary over a range of greater than 50. The single-stage star gear has a ring pitch diameter about double the likely propeller diameter. The carrier-ring bicoupled gear has a maximum gear diameter (i.e., not including the outer casing) of less than 25% of the likely propeller diameter, while the ring-ring bicoupled gear has a maximum gear diameter of less than 20% of the likely propeller diameter. Consequently, the present invention provides the best potential for building small, lightweight, steerable podded propulsors.

The advantages of the present invention are numerous. The ring-ring bicoupled contrarotating epicyclic gear occupies significantly less volume than a single-rotation gear of the same total torque output and speed and the same input speed. Gear weight and cost should be correspondingly reduced. Single-rotation planetary-planetary gears typically have excessive radial loads on the planet bearings requiring a low-ratio star first-stage. However, the rotation of both ring gears in the ring-ring bicoupled contrarotating epicyclic gear greatly reduces centrifugal loads on the first-stage planet bearings. The torque transmitted by the bicoupled contrarotating epicyclic gear to, e.g., a pod or ship hull in which it is mounted is typically reduced more than 95%. Thus, any gear or motor vibrations are easily isolated from the hull. Moreover, gear-tooth vibrations are isolated from the rotating shafts and bearings by torsional springs which are dampened by elastomers. Additionally, the ratio of output torques is very close to 1.

The present invention and many of its attendant advantages will be understood from the foregoing description and it will be apparent to those skilled in the art to which the invention relates that various modifications may be made in the form, construction and arrangement of the elements of the invention described herein without departing from the spirit and scope of the invention or sacrificing all of its material advantages. The forms of the present invention herein described are not intended to be limiting but are merely preferred or exemplary embodiments thereof.

What is claimed is:

1. A ring-ring bicoupled contrarotating epicyclic gear, comprising:

input shaft for conveying an input-torque to said ring-ring bicoupled contrarotating epicyclic gear;

a first epicyclic gear comprising:
      first sun gear coupled to said input shaft,
      a first ring gear coaxial with said first sun gear,
      a first planet carrier having a plurality of spindles attached thereto and
      a plurality of first planet gears each of said first planet gears rotatably mounted on a corresponding one of said spindles, each of said first planet gears continuously meshing with both said first sun gear and said first ring gear:

a second epicyclic gear in axial alignment with said first epicyclic gear, said second epicyclic gear comprising:
      a second sun gear,
      a second ring gear coaxial with said second sun gear,
      a second planet carrier having a plurality of spindles attached thereto, and
      a plurality of second planet gears, each of said second planet gears rotatably mounted on a corresponding one of said spindles, each of said second planet gears continuously meshing with both said second sun gear and said second ring gear;

a first interstage torque carrier drivably connecting said first ring gear and said second ring gear; and a second interstage torque carrier drivably connecting said first planet carrier and said second sun gear;

an outer-output shaft for conveying an outer-output-torque in response to said input-torque said outer-output shaft coupled to said first interstage torque carrier for rotating therewith in a first direction;

an inner-output shaft for conveying an inner-output-torque in response to said input-torque, said inner-output shaft coupled with said second planet carrier for rotating therewith in a second direction, said second direction being opposite said first direction means for flexibly connecting said plurality of spindles with corresponding ones of said first and second planet carders, wherein:
      each of said plurality of spindles is hollow,
      each of said flexible connecting means includes a plurality of flexible planar members positioned within a corresponding one of said plurality of hollow spindles and affixed at first ends to said corresponding planet carrier and at second ends to an end cap, and
      said end cap is affixed to an end portion of said corresponding hollow spindle remote from said corresponding planet carrier such that said spindle projects from said end cap toward said corresponding planet carrier.

2. A bicoupled contrarotating epicyclic gear as in claim 1 wherein empty spaces within said hollow spindle and between said flexible planar members are filled with an elastometer material.

3. A ring-ring bicoupled contrarotating epicyclic gear, comprising:

an input shaft for conveying an input-torque to said ring-ring bicoupled contrarotating epicyclic gear:

a first epicyclic gear comprising:
      a first sun gear coupled to said input shaft,
      first ring gear coaxial with said first sun gear,
      a first planet carrier having a plurality of spindles attached thereto, and
      a plurality of first planet gears, each of said first planet gears rotatably mounted on a corresponding one of said spindles, each of said first planet gears continuously meshing with both said first sun gear and said first ring gear;

a second epicyclic gear in axial alignment with said first epicyclic gear said second epicyclic gear comprising:
      second sun gear,
      a second ring gear coaxial with said second sun gear,
      a second planet carrier having a plurality of spindles attached thereto, and
      a plurality of second planet gears each of said second planet gears rotatably mounted on a corresponding one of said spindles each of said second planet gears continuously meshing with both said second sun gear and said second ring gear;

a first interstage torque carrier drivably connecting said first ring gear and said second ring gear; and a second interstage torque carrier drivably connecting said first planet carrier and said second sun gear:

an outer-output shaft for conveying an outer-output-torque in response to said input-torque, said outer-output shaft coupled to said first interstage torque carrier for rotating therewith in a first direction;

an inner-output shaft for conveying an inner-output-torque in response to said input-torque said inner-output shaft coupled with said second planet carrier for rotating therewith in a second direction, said second direction being opposite said first direction, said first ring gear and said first interstage torque carrier define a first annular space therebetween and said second ring gear and said first interstage torque carrier define a second annular space therebetween and wherein said bicoupled contrarotating epicyclic gear further comprises: first means for flexibly connecting said first ring gear with said first interstage torque carrier; and second means for flexibly connecting said second ring gear with said first interstage torque carrier, said first means positioned in said first annular space and including a substantially annular shaped flexible pleated member coupled at a first edge with said first ring gear and coupled at a second edge with said first interstage torque carrier, said second means positioned in said second annular space and including a substantially annular shaped flexible pleated member coupled at a first edge with said second ring gear and coupled at a second edge with said first interstage torque, empty spaces within said first and second annular spaces and within said flexible pleated members being filled with an elastomer material.

4. A ring-ring bicoupled contrarotating epicyclic gear, comprising:

an output shaft for conveying an output-torque in response to an outer-input-torque and an inner-input-torque:

a first epicyclic gear comprising:
a first sun gear coupled to said output shaft,
a first ring gear coaxial with said first sun gear,
a first planet carrier having a plurality of spindles attached thereto, and
a plurality of first planet gears, each of said first planet gears rotatably mounted on a corresponding one of said spindles, each of said first planet gears continuously meshing with both said first sun gear and said first ring gear;

a second epicyclic gear in axial alignment with said first epicyclic gear, said second epicyclic, gear comprising:
a second sun gear,
a second ring gear coaxial with said second sun gear,
a second planet carrier having a plurality of spindles attached thereto, and
a plurality of second planet gears, each of said second planet gears rotatably mounted on a corresponding one of said spindles, each of said second planet gears continuously meshing with both said second sun gear and said second ring gear;

a first interstage torque carrier mutually drivably connecting said first ring gear and said second ring gear;

a second interstage torque carrier mutually drivably coupling said first planter carrier and said second sun gear;

an outer-input shaft for conveying said outer-input-torque, said outer-input shaft coupled to said first interstage torque carrier for driving said second ring gear in a first direction;

an inner-input shaft for conveying said inner-input-torque, said inner-input shaft coupled with said second planet carrier for driving said second planet carrier in a second direction, said second direction being opposite said first direction, means for flexibly connecting said plurality of spindles with corresponding ones of said first and second planet carriers, each of said plurality of spindles being hollow, each of said flexible connecting means including a plurality of flexible planar members positioned within a corresponding one of said plurality of hollow spindles and affixed at first ends to said corresponding planet carrier and at second ends to an end cap, said end cap affixed to a top end of said corresponding hollow spindle; and wherein empty spaces within said hollow spindle and between said flexible planar members are filled with an elastomer material.

5. A ring-ring bicoupled contrarotating epicyclic gear as in claim 4 wherein said first ring gear and said first interstage torque carrier define a first annular space therebetween and said second ring gear and said first interstage torque carrier define a second annular space therebetween and wherein said bicoupled contrarotating epicyclic gear further comprising:

first means for flexibly connecting said first ring gear with said first interstage torque carrier; and second means for flexibly connecting said second ring gear with said first interstage torque carrier, said first means positioned in said first annular space and including a substantially annular shaped flexible pleated member coupled at a first edge with said first ring gear and coupled at a second edge with said first interstage torque carrier, said second means positioned in said second annular space and including a substantially annular shaped flexible pleated member coupled at a first edge with said second ring gear and coupled at a second edge with said first interstage torque carrier; and wherein empty spaces within said first and second annular spaces and within said flexible pleated member are filled with an elastomer material.

6. A carrier-ring bicoupled contrarotating epicyclic gear, comprising:

a rotatable input shaft for providing an input-torque to said carrier-ring bicoupled contrarotating epicyclic gear;

a first epicyclic gear comprising:
a first sun gear coupled to said input shaft,
a first ring gear coaxial with said first sun gear,
a first planet carrier having a plurality of spindles attached thereto, and
a plurality of first planet gears, each of said first planet gears rotatably mounted on a corresponding one of said spindles, each of said first planet gears continuously meshing with both said first sun gear and said first ring gear;

a second epicyclic gear in axial alignment with said first epicyclic gear, said second epicyclic gear comprising:
a second sun gear,
a second ring gear coaxial with said second sun gear,
a second planet carrier having a plurality of spindles attached thereto, and
a plurality of second planet gears, each of said second planet gears rotatably mounted on a corresponding one of said spindles, each of said second planet gears continuously meshing with both said second sun gear and said second ring gear;

a first interstage torque carrier drivably connecting said first ting gear and said second sun gear; and a second interstage torque carrier drivably connecting said first planet carrier and said second ting gear:

an outer-output shaft for conveying an outer-output-torque in response to said input-torque, said outer-output shaft connected to said second interstage torque carrier for rotating therewith in a first direction; and an inner-output shaft for conveying an inner-output-torque in response to said input-torque, said inner-output shaft coupled with said second planet carrier for rotating therewith in a second direction, said second direction being opposite said first direction, said inner-output shaft coaxial with said outer-output shaft, wherein said first and second epicyclic gears are joined in series such that said first and second sun gears, said first and second planet carriers, and said first and second ring gears rotate and convey useful torque in response to said input-torque.

7. A carrier-ring bicoupled contrarotating epicyclic gear as in claim 6 further comprising:

means for flexibly connecting said plurality of spindles with corresponding ones of said first and second planet carriers, each of said plurality of spindles being hollow, each of said flexible connecting means including a plurality of flexible planar members positioned within a corresponding one of said plurality of hollow spindles and affixed at first ends to said corresponding planet carrier and at second ends to an end cap, said end cap affixed to a top end of said corresponding hollow spindle; and wherein empty spaces within said hollow spindle and between said flexible planar members are filled with an elastomer material.

8. A carrier-ring bicoupled contrarotating epicyclic gear as in claim 7 wherein said first ring gear and said first interstage torque carrier define a first annular space therebetween and said second ring gear and said second interstage torque carrier define a second annular space therebetween and wherein said bicoupled contrarotating epicyclic gear further comprising:

first means for flexibly connecting said first ring gear with said first interstage torque carrier; and second means for flexibly connecting said second ring gear with said second interstage torque carrier, said first means positioned in said first annular space and including a substantially annular shaped flexible pleated member coupled at a first edge with said first ring gear and coupled at a second edge with said first interstage torque carrier, said second means positioned in said second annular space and including a substantially annular shaped flexible pleated member coupled at a first edge with said second ring gear and coupled at a second edge with said second interstage torque carrier; and wherein empty spaces within said first and second annular spaces and within said flexible pleated members are filled with an elastomer material.

\* \* \* \* \*